May 5, 1959 M. A. REMKE 2,885,118
METERING TANK AND CONTROL SYSTEM FOR METERING LIQUIDS
Filed Aug. 26, 1957

INVENTOR.
M. A. REMKE

BY *Hudson & Young*

ATTORNEYS

United States Patent Office 2,885,118
Patented May 5, 1959

2,885,118

METERING TANK AND CONTROL SYSTEM FOR METERING LIQUIDS

Marvin A. Remke, Bartlesville, Okla., assignor to Phillips Petroleum Company, a corporation of Delaware Application August 26, 1957, Serial No. 680,270

10 Claims. (Cl. 222—68)

This invention relates to a system for metering liquids. A specific aspect of the invention pertains to an apparatus for providing an exact liquid level in a storage or metering tank.

In the petroleum industry automatic metering of crude oil from storage tanks to pipes line has recently come into use. One type of automatic metering system is disclosed and claimed in the application of G. G. Hebard and M. A. Remke, Serial No. 622,863, filed November 19, 1956. In the system described therein, the tank must be provided with a specific structure in the top and bottom sections thereof in order for the system to function as intended. There is a definite need for a system which can be used in combination with existing tanks which do not have the structural requirements for the metering system of the above-identified application. The present invention provides such a system or arrangement of apparatus and controls.

Accordingly, it is an object of the invention to provide a metering system for accurately metering liquids from a metering or storage tank. Another object is to provide apparatus for rapidly draining liquid to an exact level in a tank. A further object of the invention is to provide a metering system which accurately drains a filled tank successively to a "full" level and then to an "empty" level. It is also an object of the invention to provide liqiud level controls for installation in all types of storage tanks which permit accurately draining of the tank to specific levels so as to accurately measure the volume of liquid between the different levels. Other objects of the invention will become apparent from a consideration of the accompanying disclosure.

Figure 1:
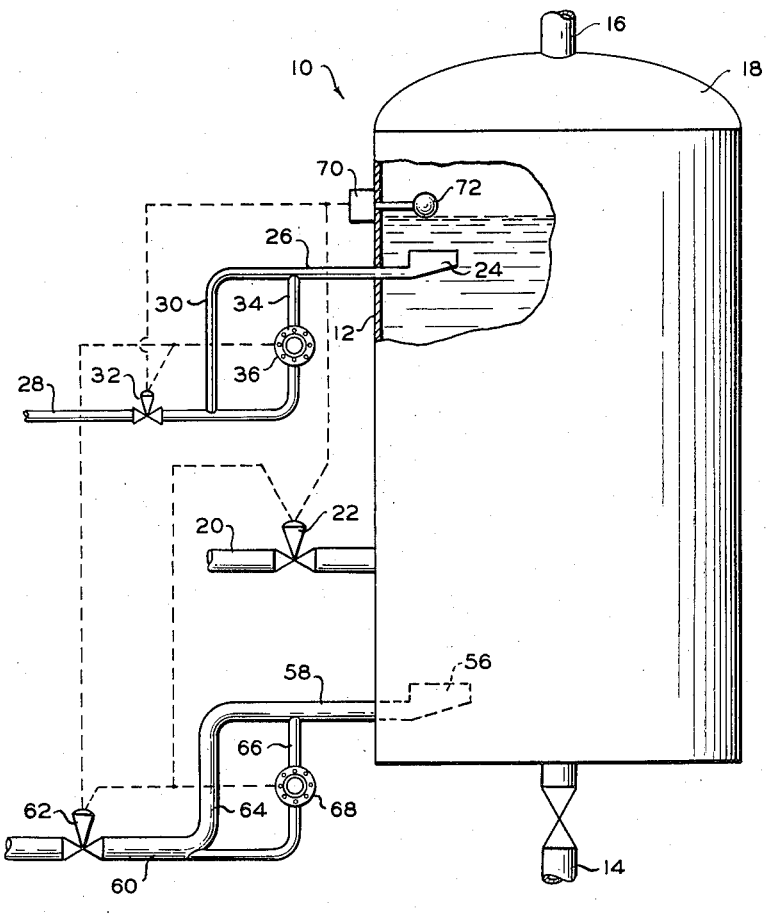
Figure 2:
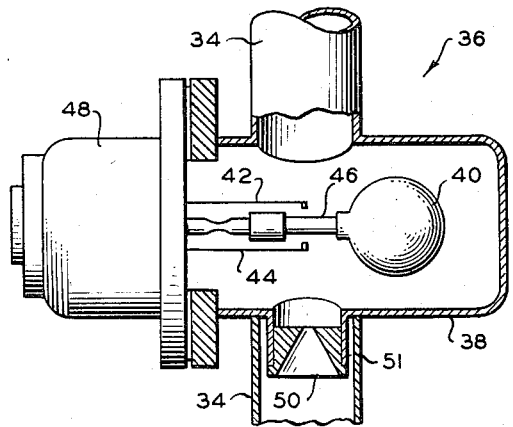

The invention will be best understood by reference to the accompanying schematic drawing of which Figure 1 is an elevation partly in section of a storage tank and metering system for metering liquid from the tank and Figure 2 is an elevation partly in section of a float control utilized in the apparatus of Figure 1.

Referring to Figure 1, a storage or metering tank 10 of conventional flat bottom design comprises a shell 12, a clean-out line 14, a vent 16 in its top 18, and a filling or supply line 20. Line 20 is provided with a motor valve 22. The liquid level control for the upper measuring level or "full" level of the tank comprises a weir box 24 with a drain line leading therefrom comprising an upper lateral section 26 and a lower lateral section 28 connected by an intermediate section 30. A motor valve 32 is positioned in section 28. An auxiliary line 34 connects with the lower side of line 26 and with line 28 upstream of valve 32. Positioned in line 34 is a flow sensing and controlling device 36 which is shown in Figure 2 as an expanded section in line 34 comprising a housing 38 within which is positioned a float 40 protected by limits 42 and 44. Float 40 is positioned on the end of a flexible tubing 46 which pivots in the housing and closes an electrical switch housed in explosion proof housing 48. The device is arranged so that a lowering of float 40 to limit 44 closes the switch which sends out a signal utilized to control the operation of valves in the system as subsequently described.

An orifice 50 positioned in line 34 downstream of float 40 restricts flow thru the auxiliary line 34 so that housing 38 is full of liquid during drain-down except when flow from weir box 24 is reduced to a predetermined minimum determined by the diameter of the orifice. Orifice 50 is threaded into nipple 51 and is removable so that the orifice size may be changed. The orifice should be constructed of a material to which paraffin and other petroleum deposits do not adhere, such as Marlex (a trademarked polyolefin of Phillips Petroleum Company), Teflon (a tetrafluoroethylene resin) or other suitable plastic. The orifice opening is funnel shaped to minimize any tendency of solids to plug or bridge in the orifice.

A second weir box 56 positioned at a lower level near the bottom of the tank is provided with a similar drain-down system of conduits and controls to that of the upper level drain-down system, including an upper lateral section 58, a lower lateral section 60 containing motor valve 62, and an intermediate section 64. Auxiliary line 66, including float control 68 (which is represented in Figure 2 as device 36) provides the control for the lower drain-down system. Float control 68, with its associated switch, operates motor valve 62 to close the same and also motor valve 22 to open the same and initiate another filling and metering sequence.

A liquid level control 70 of any suitable type, such as the float control shown in the drawing, is positioned at an upper level in tank 10 above the level of weir box 24. This level control closes valve 22 and opens valve 32 when liquid in the tank reaches the level of float 72 so as to shut off flow of liquid into the tank and start the flow of liquid thru weir box 24 and the system of drain conduits connected therewith. As the liquid flows out thru line 26 during the early stages of drain-down, lines 30 and 34 both carry the flow and because of orifice 50 the flow thru line 34 is restricted. As the drain-down level approaches the weir level of weir box 24, flow thru line 26 is diminished and finally all of the liquid flows thru line 34. When the flow of liquid thru orifice 50 becomes greater than the flow into housing 38, the level of liquid in this housing drops so that float 40 lowers and actuates the electric switch in housing 48. Operation of the switch closes valve 32 and opens valve 62 in the low drain-down system associated with lower weir box 56 so that drain down of the tank from the "full" level to the "empty" level is effected. Line 60 commonly connects with a pipe line into which the liquid is metered. When the level of liquid in tank 10 approaches the weir level of weir box 56, float control 68 and its associated switch operate in the same manner as described in connection with float control 36 so that when flow thru line 66 reaches a predetermined minimum determined by the size of orifice 50, the float actuates the switch which closes valve 62 and opens valve 22 so that another metering sequence is initiated.

It is to be understood that the switches and other control elements utilized in the invention operate thru a control panel in known manner, although the linkages shown in the drawing are directly with the valve being operated. The valves may be air operated or operated by a solenoid, as desired, both of which are conventional methods of valve operation.

Various types of float switches are commercially available for use in lines 34 and 66 as device 36 or 68. It is also feasible to utilize a mechanical linkage between float 40 and an air valve in an air operating system for operating the various motor valves in the system described. Device 36 represents any means for operating motor valves in the system when flow thru line 34 reaches a predetermined minimum, indicating that the liquid level has reached the weir level.

The metering system shown in Figure 1 includes identical drain-down systems to a specific liquid level but it is to be understood that different drain-down systems may be utilized at these levels. In application of the device of the invention to conventional conical bottom tanks having good drain characteristics, it is preferred to utilize the upper drain-down system shown in the drawing and an ordinary liquid level controller in the outlet conduit from the bottom of the tank for the lower liquid level as disclosed in the application of Hebard et al., identified above.

As a practical matter the drain-down conduits associated with weir box 24 may be considerably smaller than the drain-down conduits associated with weir box 56, since float 72 may be positioned at only a slightly higher level than the weir of weir box 24, while the entire measured volume of tank 10 must pass thru line 60.

The rapidity of drain-down to the weir level of weir box 24 depends largely upon the length of the weir. In one application, weir 24 was constructed of an upright section of 12 inch casing, having about 38 inches of weir length over which the liquid drained and the orifice in the auxiliary line was ¼ inch in diameter. These elements were utilized in a 200 barrel tank and the system operated very satisfactorily in metering crude oil to a pipeline. However, if faster drain down is desired, weir box 24 may be constructed of larger sized tubing or casing cut in half, longitudinally, and positioned horizontally in a tank with the ends closed to the level of the sides of the semi-cylindrical trough formed thereby. In this manner, a half section of 8 inch casing 36 inches long would provide about 88 inches of weir surface over which the liquid would drain.

Certain modifications of the invention will become apparent to those skilled in the art and the illustrative details disclosed are not to be construed as imposing unnecessary limitations on the invention.

I claim:

1. Apparatus comprising in combination a tank having a valved liquid supply line and means for draining said tank to a selected level comprising a weir box within said tank; a drain line including an upper lateral section connected with said weir box and a lower lateral section downstream of said upper section having a valve therein, an auxiliary line connecting the bottom side of said upper section with said lower section to provide a second flow path for liquid, and means in said auxiliary line for actuating the valve in the lower section of said drain line when flow thru said auxiliary line reaches a predetermined minimum thereby indicating substantially complete drain down to the weir level.

2. The apparatus of claim 1 wherein last said means comprises an expanded section in said auxiliary line having a float therein; means actuatable by lowering said float operatively connected with the valve in said lower section; and a flow-restricting device in said auxiliary line downstream of said expanded section.

3. The apparatus of claim 2 wherein said device comprises an orifice.

4. The apparatus of claim 2 wherein said float is operatively connected with an electrical switch and said switch is operatively connected with the valve in said lower section.

5. A metering tank comprising the apparatus of claim 1 wherein said level is an upper level in said tank and including a second means for draining said tank to a second lower level in said tank as defined in claim 1.

6. The metering tank of claim 5 including a level control sensitive to a level above the upper weir box in actuating control of the valve in said supply line and adapted to close same when liquid reaches said level.

7. The metering tank of claim 6 wherein said level control is also operatively connected with the valve in said lower section of the upper level means and adapted to open same.

8. A liquid metering system comprising an upright tank having a valved supply line; means for draining said tank to an upper level comprising a weir box at an upper level in said tank, a drain line from said weir box including an upper lateral section and a downstream lower lateral section having a valve therein, an auxiliary line connecting the bottom side of said upper section with said lower section upstream of the valve therein to provide a second flow path for liquid between said sections, and means in said auxiliary line for actuating the valve in said lower section when flow therethru reaches a predetermined minimum; a second means for draining said tank to a level therein near the bottom of the structure defined above; and level sensing means for closing the valve in said supply line and opening the valve in the lower section of the upper drain line when a liquid level in said tank above the upper weir box is reached.

9. The system of claim 8 wherein said means in each said auxiliary line comprises an expanded section having a float therein; a flow-restricting device in each said auxiliary line downstream of said expanded section; means actuatable by lowering said float operatively connected with the valve in each said lower section so that, as the liquid level in said tank reaches the level of the respective weir box, flow through said auxiliary line is reduced thereby allowing said float to fall.

10. The system of claim 9 wherein the float in the auxiliary line of the lower level draining means also opens the valve in said supply line.

References Cited in the file of this patent
UNITED STATES PATENTS

| | | |
|---|---|---|
| 1,245,809 | Smirz | Nov. 6, 1917 |
| 1,346,898 | Kingsbury | July 20, 1920 |
| 1,766,287 | DiTella | June 24, 1930 |
| 1,907,001 | Peter | May 2, 1933 |
| 2,814,200 | Hills | Nov. 26, 1957 |